(12) United States Patent
Takeuchi

(10) Patent No.: US 10,425,889 B2
(45) Date of Patent: Sep. 24, 2019

(54) COMMUNICATION DEVICE

(71) Applicant: Brother Kogyo Kabushiki Kaisha, Nagoya-shi, Aichi-ken (JP)

(72) Inventor: Shun Takeuchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 85 days.

(21) Appl. No.: 15/255,208

(22) Filed: Sep. 2, 2016

(65) Prior Publication Data
US 2017/0070951 A1    Mar. 9, 2017

(30) Foreign Application Priority Data
Sep. 3, 2015   (JP) .................. 2015-174011

(51) Int. Cl.
  *H04W 48/20* (2009.01)
  *H04N 1/00* (2006.01)
  *H04W 76/14* (2018.01)

(52) U.S. Cl.
  CPC ........ *H04W 48/20* (2013.01); *H04N 1/00106* (2013.01); *H04N 1/00307* (2013.01); *H04W 76/14* (2018.02)

(58) Field of Classification Search
  CPC ...... H04W 8/005; H04W 84/18; H04W 48/16
  See application file for complete search history.

(56) References Cited

U.S. PATENT DOCUMENTS 7,489,900 B2    2/2009   Kawakami et al.
7,742,742 B2    6/2010   Watanabe et al.
8,131,859 B2    3/2012   Fujii et al.
(Continued)

FOREIGN PATENT DOCUMENTS

EP           1307003 A2    5/2003
JP        2002-297465 A   10/2002
(Continued)

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Romani Ohri
(74) *Attorney, Agent, or Firm* — Banner & Witcoff, Ltd.

(57) ABSTRACT

A communication device may search via a first wireless interface so as to specify one or more candidate access points and send, to a terminal device, an information request for requesting the terminal device to send information for establishing a wireless connection with an experienced access point. The experienced access point is an access point having an experience of establishing a wireless connection with the terminal device. The terminal device stores use information which has been used by the terminal device for establishing the wireless connection with the experienced access point. The communication device may receive a response including a target password included in the use information from the terminal device in response to sending the information request and establish a wireless connection with a target access point among the one or more candidate access points via the first wireless interface by using the target password included in the response.

16 Claims, 7 Drawing Sheets

(56) References Cited

U.S. PATENT DOCUMENTS

| | | | |
|---|---|---|---|
| 8,457,085 B2 | 6/2013 | Izaki | |
| 2003/0115339 A1 | 6/2003 | Hodoshima | |
| 2005/0054329 A1 | 3/2005 | Kokudo | |
| 2005/0054369 A1 | 3/2005 | Murakami | |
| 2005/0148326 A1 | 7/2005 | Nogawa et al. | |
| 2005/0272386 A1 | 12/2005 | Kawakami et al. | |
| 2006/0153156 A1 | 7/2006 | Wentink et al. | |
| 2006/0206592 A1 | 9/2006 | Fujii et al. | |
| 2006/0246941 A1* | 11/2006 | Watanabe | H04W 48/16 455/552.1 |
| 2007/0040893 A1 | 2/2007 | Kawakami et al. | |
| 2007/0086394 A1 | 4/2007 | Yamada et al. | |
| 2007/0121541 A1 | 5/2007 | Matsuo | |
| 2007/0204045 A1 | 8/2007 | Shima | |
| 2008/0024591 A1 | 1/2008 | Doi et al. | |
| 2009/0046686 A1 | 2/2009 | Izaki | |
| 2010/0016007 A1* | 1/2010 | Satake | H04W 4/08 455/518 |
| 2012/0110100 A1* | 5/2012 | Hiramatsu | H04L 61/2575 709/206 |
| 2012/0240191 A1* | 9/2012 | Husney | H04W 12/04 726/3 |
| 2012/0258658 A1 | 10/2012 | Matsuo | |
| 2013/0010646 A1* | 1/2013 | Liu | H04W 4/70 370/255 |
| 2013/0072259 A1 | 3/2013 | Kusano et al. | |
| 2013/0179910 A1* | 7/2013 | Hio | G06Q 30/0241 725/10 |
| 2014/0362841 A1 | 12/2014 | Shibata | |
| 2015/0334675 A1* | 11/2015 | Cho | H04W 24/02 455/435.1 |
| 2015/0341358 A1* | 11/2015 | Borovikov | H04L 63/10 726/27 |
| 2016/0007391 A1* | 1/2016 | Yu | H04W 48/16 370/328 |
| 2016/0302032 A1* | 10/2016 | Chesnutt | H04W 4/02 |

FOREIGN PATENT DOCUMENTS

| | | |
|---|---|---|
| JP | 2004-328269 A | 11/2004 |
| JP | 2005-065018 A | 3/2005 |
| JP | 2005-086583 A | 3/2005 |
| JP | 2005-142792 A | 6/2005 |
| JP | 2005-174134 A | 6/2005 |
| JP | 2005-218037 A | 8/2005 |
| JP | 2005-347911 A | 12/2005 |
| JP | 2006-311137 A | 11/2006 |
| JP | 2006-352577 A | 12/2006 |
| JP | 2007-074390 A | 3/2007 |
| JP | 2007-081890 A | 3/2007 |
| JP | 2007-150984 A | 6/2007 |
| JP | 2009-044701 A | 2/2009 |
| JP | 2011-250215 A | 12/2011 |
| JP | 2014-241487 A | 12/2014 |

OTHER PUBLICATIONS

Feb. 4, 2009—(EP) Extended Search Report—App 08252670.8.
Stevens, R., "TCT/IP Illustrated, vol. 1—The Protocols", Professional Computing Series, Jan. 1994, pp. 33-51 and pp. 85-96, Addison-Wesley, US.
Apr. 3, 2012—(JP) Office Action—App 2007-210665.
Aug. 26, 2014—(JP) Office Action—App 2013-245373.
May 21, 2019—(JP) Notification of Reasons for Rejection—App 2015-174011, Eng Tran.

* cited by examiner

FIG. 1

FIG. 4
(First Embodiment: Case B)

FIG. 5
(Second Embodiment)

FIG. 6
(Third Embodiment)

COMMUNICATION DEVICE

CROSS-REFERENCE TO RELATED APPLICATION

This application claims priority to Japanese Patent Application No. 2015-174011, filed on Sep. 3, 2015, the entire contents of which are hereby incorporated by reference into the present application.

TECHNICAL FIELD

The present application discloses a technology relating to communication device capable of establishing a wireless connection with an access point.

BACKGROUND ART

A system including an access point, a first printer, and a second printer is generally known. The first printer stores a network wireless setting for performing wireless communication with the access point. The first printer sends the network wireless setting to the second printer via ad-hoc wireless communication. The second printer performs wireless communication with the access point using the network wireless setting.

SUMMARY

A state is conceivable where, for example, capabilities related to wireless communication differ between the first printer and the second printer. Therefore, even if the first printer is capable of performing wireless communication with the access point, there is a possibility that the second printer is incapable of performing wireless communication with that access point. In such a state, even if the second printer receives the network wireless setting from the first printer, the second printer cannot perform wireless communication with the access point using that network wireless setting. In the present specification, a technique that a communication device may appropriately establish a wireless connection with an access point is provided.

A communication device may comprise: a first wireless interface; a processor; and a memory configured to store computer-readable instructions therein, the computer-readable instructions, when executed by the processor, causing the communication device to perform: searching via the first wireless interface so as to specify one or more candidate access points, the candidate access point being an access point with which the communication device may establish a wireless connection; sending an information request to a terminal device, the information request being for requesting the terminal device to send information for establishing a wireless connection with an experienced access point, the experienced access point being an access point having an experience of establishing a wireless connection with the terminal device, the terminal device storing use information which has been used by the terminal device for establishing the wireless connection with the experienced access point; receiving a response including a target password included in the use information from the terminal device in response to sending the information request; and establishing a wireless connection with a target access point among the one or more candidate access points via the first wireless interface by using the target password included in the response.

A control method and computer-readable instructions for implementation of the communication device described above, and a non-transitory computer-readable recording medium in which the computer-readable instructions are stored, are also novel and useful.

Figure 1:
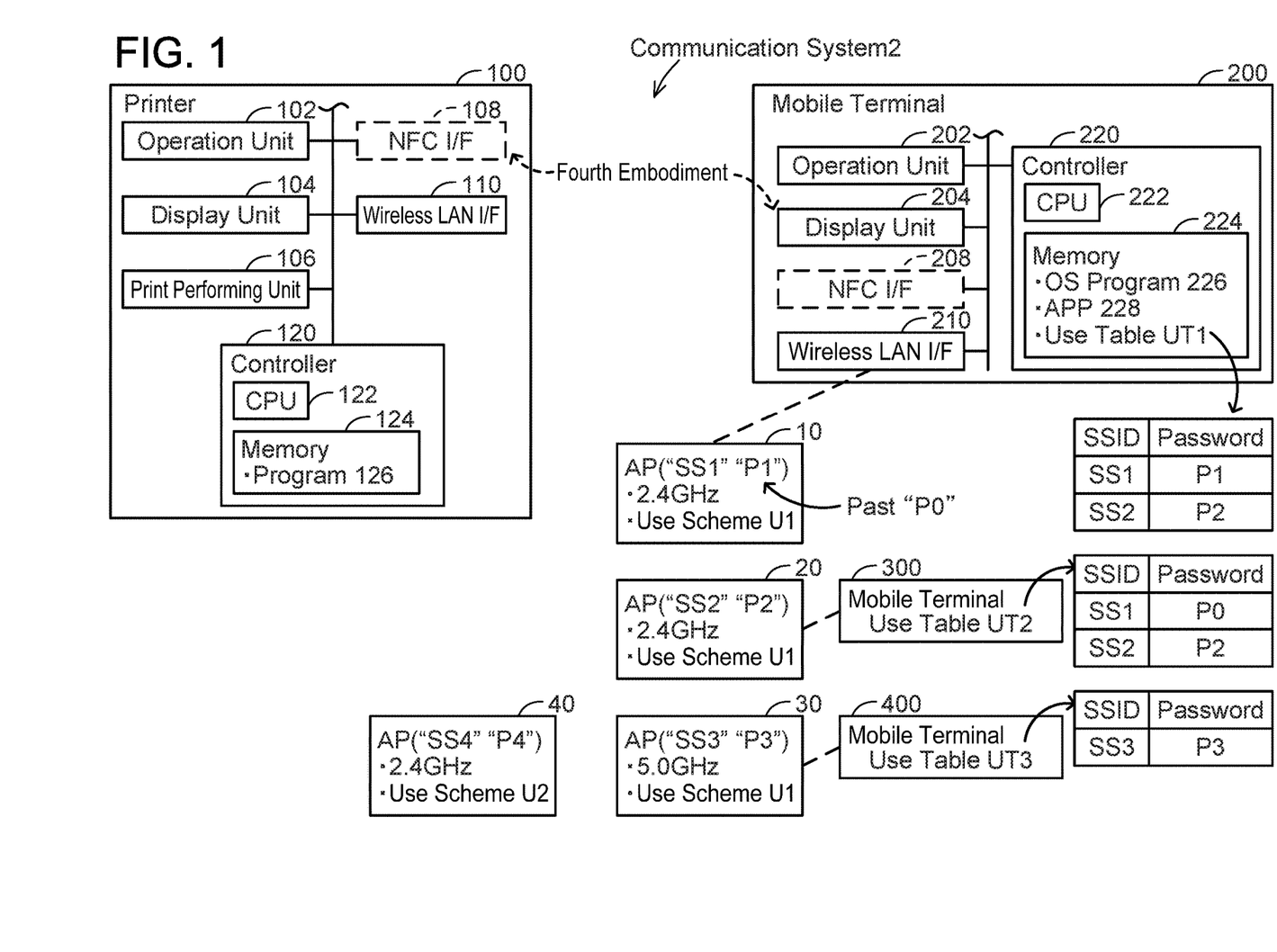
FIG. 1 shows a configuration of a communication system.

DETAILED DESCRIPTION OF INVENTION (First Embodiment)
(Configuration of Communication System 2; FIG. 1)

As shown in FIG. 1, the communication system 2 includes a printer 100 and a plurality of mobile terminals 200 and the like. The printer 100 is capable of establishing a wireless connection with access point (hereinafter, referred to as "AP") 10 and the like to participate in a wireless network formed by the APs 10 and the like. In this case, the printer 100 can perform communication with the mobile terminal 200 and the like using the wireless network (i.e., via the AP 10 and the like). Hereinafter, a network may be described as a "NW". Moreover, the printer 100 can establish a wireless connection with the mobile terminal 200 and the like in accordance with a WFD (abbreviation of Wi-Fi Direct (a registered trademark)) scheme. In this case, the printer 100 can perform communication with the mobile terminal 200 and the like without involving the AP 10 and the like.

(Configuration of printer 100)

The printer 100 is a peripheral device (i.e., a peripheral device of the mobile terminal 200 and the like) capable of performing a print function. The printer 100 includes an operation unit 102, a display unit 104, a print performing unit 106, a wireless LAN interface 110, and a controller 120. The respective units 102 to 120 are connected to a bus line (reference character omitted). Moreover, below, an interface will be described as an "I/F". Moreover, the printer 100 according to the present embodiment does not comprise an NFC I/F 108. The NFC I/F 108 will be used in a fourth embodiment described later.

The operation unit 102 includes a plurality of keys. By operating the operation unit 102, a user can input various instructions to the printer 100. The display unit 104 is a display for displaying various kinds of information. The print performing unit 106 is a printing mechanism such as an inkjet scheme, a laser scheme, or the like.

The controller 120 includes a CPU 122 and a memory 124. The CPU 122 is a processor that executes various processes in accordance with a program 126 stored in the memory 124. The memory 124 is configured by a volatile memory, a non-volatile memory, or the like.

The wireless LAN I/F 110 is an I/F for performing wireless communication in accordance with a Wi-Fi scheme. For example, a Wi-Fi scheme is a wireless communication scheme for performing wireless communication in accordance with the 802.11 standard created by IEEE (abbreviation of The Institute of Electrical and Electronics Engineers, Inc.) or to equivalent standards (e.g., 802.11a, 11b, 11g, 11n, etc.). More specifically, the wireless LAN I/F 110 supports the WFD scheme developed by the Wi-Fi Alliance. The WFD scheme is a wireless communication scheme described in the specifications "Wi-Fi Peer-to-Peer (P2P) Technical Specification Version1.1" created by the Wi-Fi Alliance.

In a Wi-Fi scheme, a frequency in the 2.4 GHz band or the 5.0 GHz band is normally used. However, in the present embodiment, while the wireless LAN I/F 110 is capable of using a frequency in the 2.4 GHz band, the wireless LAN I/F 110 is incapable of using a frequency in the 5.0 GHz band. Moreover, in a Wi-Fi scheme, authentication and encryption are performed in accordance with a combination of an authentication scheme (e.g., WPA-PSK and WPA2-PSK, etc.) and an encryption scheme (e.g., TKIP, AES, and WEP, etc.). Hereinafter, a combination of an authentication scheme and an encryption scheme will be referred to as a "use scheme". The wireless LAN I/F 110 only supports a use scheme (hereinafter, denoted by reference character U1) that is a part of all known use schemes. In other words, while the wireless LAN I/F 110 is capable of establishing a wireless connection in accordance with the use scheme U1, the wireless LAN I/F 110 is incapable of establishing a wireless connection in accordance with a use scheme (hereinafter, denoted by reference character U2) that differs from the use scheme U1.

(Configuration of AP10)

Each of AP 10 and the like is an ordinary AP that is referred to as a wireless access point, a wireless LAN router, or the like. Each of the AP 10 and the like currently forms a wireless NW in which a frequency in the 2.4 GHz band or the 5.0 GHz band is used. Specifically, each of APs 10, 20, and 40 forms a wireless NW in which a frequency in the 2.4 GHz band is used and an AP 30 forms a wireless NW in which a frequency in the 5.0 GHz band is used. Moreover, each of APs 10, 20, and 30 forms a wireless NW in which the use scheme U1 is used and an AP 40 forms a wireless NW in which the use scheme U2 is used.

APs with which the printer 100 can establish a wireless connection are limited. Specifically, the printer 100 can establish wireless connections with the respective APs 10 and 20 which use a frequency in the 2.4 GHz band and which use the use scheme U1. On the other hand, the printer 100 cannot establish a wireless connection with the AP 30 which uses a frequency in the 5.0 GHz and cannot establish a wireless connection with the AP 40 which uses the use scheme U2.

Each of the AP 10 and the like uses an SSID and a password as information for forming a wireless NW. An SSID (abbreviation of Service Set Identifier) is an identifier for identifying a wireless NW formed by the AP 10 and the like or, in other words, an identifier for identifying the AP 10 and the like. A password is information used for authentication and encryption when establishing a wireless connection with the AP 10 and the like. The AP 10 is currently establishing a wireless NW in which an SSID "SS1" and a password "P1" are used. Moreover, the AP 10 has an experience of having previously established a wireless NW in which the SSID "SS1" and a password "P0" were used. Moreover, the other APs 20, 30, and 40 are respectively currently establishing a wireless NW in which an SSID and a password described in FIG. 1 are used. Specifically, the APs 20, 30, and 40 are establishing wireless NWs in which "SS2" and "P2", "SS3" and "P3", and "SS4" and "P4" are respectively used as the SSID and the password.

(Configuration of Mobile Terminal 200)

Each of the mobile terminal 200 and the like is, for example, a portable terminal such as a mobile phone, a smart phone, a notebook PC, and a tablet PC. The mobile terminal 200 includes an operation unit 202, a display unit 204, a wireless LAN I/F 210, and a controller 220. The respective units 202 to 220 are connected to a bus line (reference character omitted). Moreover, in the present embodiment, the mobile terminal 200 is not provided with an NFC I/F 208. The other mobile terminals 300 and 400 have a similar configuration to the mobile terminal 200.

The operation unit 202 is constituted by a plurality of keys. By operating the operation unit 202, a user can input various instructions to the mobile terminal 200. The display unit 204 is a display for displaying various kinds of information. The display unit 204 functions as a so-called touch panel. That is, the display unit 204 also functions as an operation unit that is operated by the user. The wireless LAN I/F 210 is an I/F for performing wireless communication in accordance with a Wi-Fi scheme and supports the WFD scheme. The wireless LAN I/F 210 is also capable of using frequencies in both the 2.4 GHz band and the 5.0 GHz band. Moreover, the wireless LAN I/F 210 is capable of establishing a wireless connection in accordance with the use scheme U1 in a similar manner to the printer 100. Furthermore, the wireless LAN I/F 210 is also capable of establishing a wireless connection in accordance with the use scheme U2 which the printer 100 is incapable of using.

The controller 220 includes a CPU 222 and a memory 224. The CPU 222 executes various processes in accordance with programs 226 and 228 stored in the memory 224. The memory 224 is constituted by a volatile memory, a non-volatile memory, or the like. The memory 224 stores, in addition to an OS (abbreviation of Operating System) program 226 for realizing basic processing, an application program (hereinafter, referred to as an "APP") 228 and a use table UT1.

The APP 228 is a program provided by a vendor of the printer 100 in order to supply use information (that is, a combination of an SSID and a password) stored in the mobile terminal 200 to the printer 100. For example, the APP 228 may be installed to the mobile terminal 200 from an internet server (not illustrated) provided by the vendor or may be installed to the mobile terminal 200 from a medium that is shipped together with the printer 100.

The use table UT1 is a table in which use information is registered. Use information is information used by the mobile terminal 200 in order to establish a wireless connection with the AP 10 and the like. In a case where a wireless connection with the AP 10 and the like is established, the mobile terminal 200 registers the use information used in order to establish the wireless connection in the use table UT1. The mobile terminals 300 and 400 also respectively store use tables UT2 and UT3.

The mobile terminal 200 has an experience of having established a wireless connection with the AP 10 after the password used by the AP 10 had been changed from "P0" to "P1" and maintains a state where the wireless connection with the AP 10 is established. Therefore, use information (that is, "SS1" and "P1") corresponding to the AP 10 is registered in the use table UT1. Moreover, the mobile terminal 200 has an experience of having established a wireless connection with the AP 20 before establishing a wireless connection with the AP 10. Therefore, use information (that is, "SS2" and "P2") corresponding to the AP 20 is further registered in the use table UT1.

The mobile terminal 300 has an experience of having established a wireless connection with the AP 10 before the password used by the AP 10 had been changed from "P0" to "P1". Therefore, use information (that is, "SS1" and "P0") corresponding to the AP 10 is registered in the use table UT2. Moreover, the mobile terminal 300 has an experience of having established a wireless connection with the AP 20 and maintains a state where the wireless connection with the AP 20 is established. Therefore, use information (that is, "SS2" and "P2") corresponding to the AP 20 is further registered in the use table UT2.

Moreover, the mobile terminal 400 has an experience of having established a wireless connection with the AP 30 and maintains a state where the wireless connection with the AP 30 is established. Therefore, use information (that is, "SS3" and "P3") corresponding to the AP 30 is registered in the use table UT3. Moreover, none of the mobile terminals 200 to 400 have an experience of having established a wireless connection with the AP 40. Therefore, use information (that is, "SS4" and "P4") corresponding to the AP 40 is not registered in any of the use tables UT1 to UT3.

Figure 2:
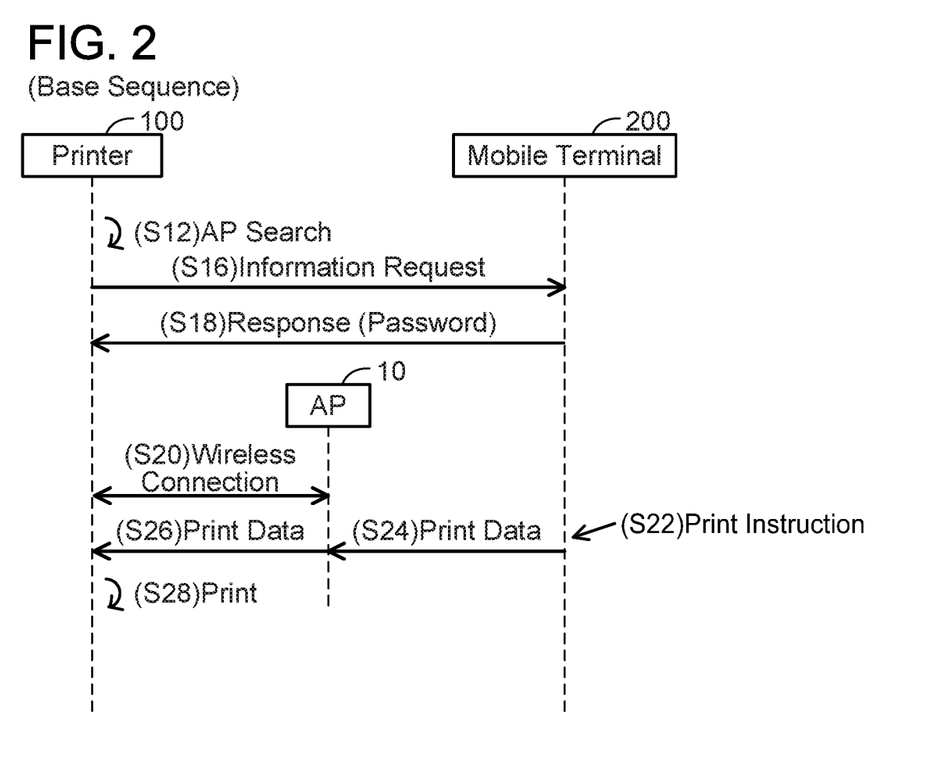
FIG. 2 shows a base sequence chart representing a common process of all embodiments.

(Base Sequence: FIG. 2)

Referring to FIG. 2, a base sequence for the printer 100 establishing a wireless connection with, for example, the AP 10 will be described. FIG. 2 shows a sequence representing a process that is common to the respective cases shown in FIGS. 3 to 7 to be described later.

In S12, the CPU 122 performs a search via the wireless LAN I/F 110 and specifies one or more candidate APs from APs 10 to 40. A candidate AP is an AP with which the printer 100 can establish a wireless connection or, in other words, an AP which conforms to a wireless communication capability of the printer 100 (that is, a capability of the wireless LAN I/F 110). In the present embodiment, the wireless LAN I/F 110 is capable of only using a frequency in the 2.4 GHz band and only using the use scheme U1. As a result, the candidate APs are APs 10 and 20 among the APs 10 to 40.

In S16, the CPU 122 sends an information request for requesting sending of information for establishing a wireless connection with an experienced AP to, for example, the mobile terminal 200. An experienced AP is an AP having an experience of a wireless connection being established with the mobile terminal 200. In the present embodiment, the APs 10 and 20 are respectively experienced APs.

In S18, in a case where the mobile terminal 200 stores use information (that is, "SS1" and "P1": refer to table UT1 shown in FIG. 1) used in order to establish a wireless connection with the AP 10 that is an experienced AP, the CPU 122 receives a response including a target password (that is, "P1") included in the use information from the mobile terminal 200 in response to sending of the information request of S16.

In S20, the CPU 122 uses the target password included in the response to establish a wireless connection with the target AP 10 among the one or more candidate APs 10 and 20 via the wireless LAN I/F 110.

For example, let us assume a state where the printer 100 sends an information request to the mobile terminal 400 and receives a response including the password "P3" being used by the experienced AP 30 from the mobile terminal 400. In this case, since the printer 100 does not have the capability of using a frequency in the 5.0 GHz band being used by the AP 30, the printer 100 is unable to establish a wireless connection with the AP 30 using the password "P3". Moreover, for example, let us assume a state where, in a case where any of the mobile terminals (for example, the mobile terminal 300) has an experience of having established a wireless connection with the AP 40, the printer 100 sends an information request to the mobile terminal and receives a response including the password "P4" being used by the experienced AP 40 from the mobile terminal. In this case, since the printer 100 does not have the capability of using the use scheme U2 being used by the AP 40, the printer 100 is unable to establish a wireless connection with the AP 40 using the password "P4". In contrast, in the present embodiment, the printer 100 specifies candidate APs 10 and 20 with which the printer 100 is capable of establishing a wireless connection (S12). Therefore, using the target password "P1" included in the response received from the mobile terminal 200, the printer 100 can appropriately establish a wireless connection with the target AP 10 among the one or more candidate APs 10 and 20.

Once the printer 100 establishes a wireless connection with the AP 10, a state is constructed where both the printer 100 and the mobile terminal 200 belong to a wireless NW formed by the AP 10. In this case, the printer 100 and the mobile terminal 200 can communicate various kinds of data using the wireless NW (that is, via the AP 10). For example, in S22, the CPU 222 accepts a print instruction from the user. In this case, in S24 and S26, the CPU 222 sends print data to the printer 100 via the AP 10. Print data is data having a data format that can be interpreted by the print performing unit 106.

In a case where print data is received from the mobile terminal 200, in S28, the CPU 122 supplies print data to the print performing unit 106 and causes the print performing unit 106 to print an image represented by the print data.

Figure 3:
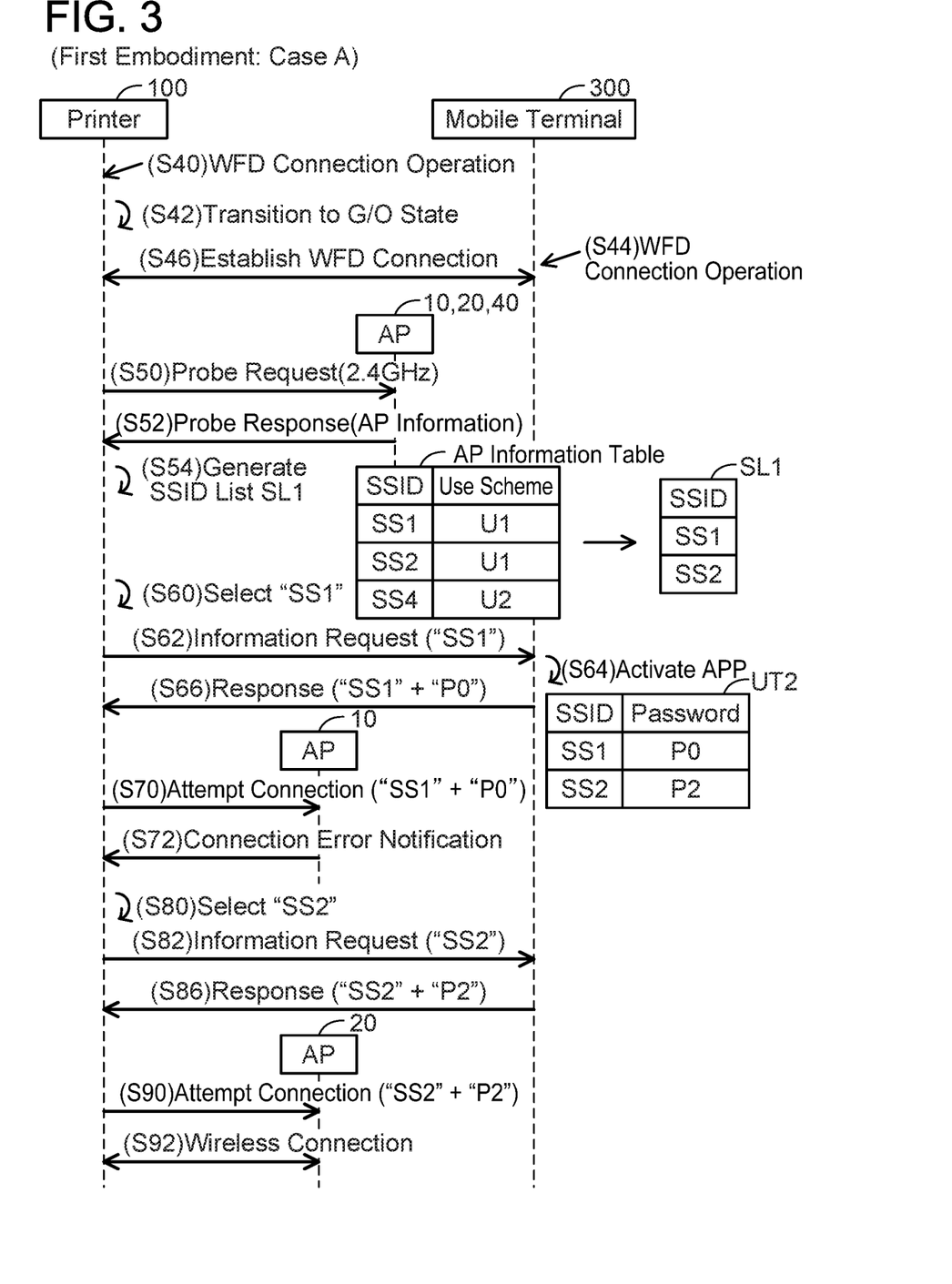
FIG. 3 shows a sequence chart for a case A where information request is sent to only one mobile terminal.

(Case A Where Information Request is Sent to Only on Mobile Terminal; FIG. 3)

A specific case A in accordance with the base sequence shown in FIG. 2 will be described with reference to FIG. 3. The present case assumes a state where the printer 100 receives use information from the mobile terminal 300 and establishes a wireless connection with an AP.

In S40, the CPU 122 accepts a WFD connection operation performed on the operation unit 102 by the user. A WFD connection operation is an operation for establishing a connection in accordance with the WFD scheme (hereinafter, referred to as a "WFD connection") between the printer 100 and another device and corresponds to a push button operation in a PBC (abbreviation of Push-Button Configuration) scheme in a WPS (abbreviation of Wi-Fi Protected Setup). WPS is a scheme formulated by the Wi-Fi Alliance and is referred to as an automatic wireless connection scheme or a simple wireless connection scheme. The WPS scheme is a scheme for automatically establishing a wireless connection between a pair of devices even when information for establishing the wireless connection (for example, a password) is not input by a user at each of the pair of devices.

In S42, the CPU 122 causes an operating state of the printer 100 to make a transition from a device state to a G/O (abbreviation of Group Owner) state in the WFD scheme. The G/O state is a state of operating as a parent station of a wireless NW in accordance with the WFD scheme. The device state is a state other than the G/O state and a CL (abbreviation of Client) state in the WFD scheme. The CPU 122 determines an SSID and a password when making a transition to a state of operating as a parent state or, in other words, the G/O state and forms a wireless NW in which the determined information is used. At this stage, only the printer 100 belongs to the wireless NW and other devices are yet to join the wireless NW.

In S44, the mobile terminal 300 accepts a WFD connection operation. In this case, although not illustrated, the mobile terminal 300 sends, by broadcast, a probe request for searching a parent station of the wireless NW which exists around the mobile terminal 300.

The CPU 122 receives the probe request from the mobile terminal 300 via the wireless LAN I/F 110. In this case, the CPU 122 sends a probe response including the SSID determined in S42 and performance information indicating that a push button operation in the PBC scheme has been performed to the mobile terminal 300 via the wireless LAN I/F 110. Moreover, each of the APs 10 to 40 also sends a probe response to the mobile terminal 300 in response to receiving the probe request from the mobile terminal 300. However, the response does not include the performance information described above. Hereinafter, the description "via the wireless LAN I/F 110" will be omitted unless there is a particular need to include the description.

In a case where probe responses from the printer 100 and the APs 10 to 40 are received, the mobile terminal 300 determines that a wireless connection with the printer 100 which is a sender of a probe response including performance information should be established. Subsequently, in S46, the mobile terminal 300 communicates various signals (for example, an Authentication signal, an Association signal, and a 4-way handshake) with the printer 100 so as to establish a WFD connection with the printer 100.

When the various signals described above is communicated with the mobile terminal 300 and a WFD connection with the mobile terminal 300 is established in S46, the CPU 122 searches for the AP 10 and the like that exist around the printer 100 in S50. Specifically, the CPU 122 sends, by broadcast, a probe request using a frequency in the 2.4 GHz band. While the probe request is received by the APs 10, 20, and 40 which use a frequency in the 2.4 GHz band, the probe request is not received by the AP 30 which uses a frequency in the 5.0 GHz band. As a result, in S52, the CPU 122 receives three probe responses from the three APs 10, 20, and 40. The probe responses include AP information. AP information includes an SSID used in a wireless NW formed by a sender AP and scheme information indicating a use scheme that is used in the wireless NW.

In S54, the CPU 122 first generates an AP information table describing the three pieces of AP information included in the three probe responses. Moreover, the CPU 122 specifies two SSIDs "SS1" and "SS2" associated with the use scheme U1 supported by the wireless LAN I/F 110 from the AP information table and generates an SSID list SL1 describing the two identified SSIDs. Accordingly, the CPU 122 can specify the two candidate APs 10 and 20 with which the printer 100 can establish a wireless connection.

As described above, when the WFD connection in S46 is established, the CPU 122 automatically performs a search via the wireless LAN I/F 110 (S50 and S52) and specifies the candidate APs 10 and 20 (S54) without accepting further operations by the user. As a result, user's convenience can be improved.

In S60, the CPU 122 automatically selects one SSID "SS1" from the SSID list SL1 without accepting an operation for selecting an SSID from the user. Specifically, when each of probe responses of S52 from each of the AP 10 and the like is received, the CPU 122 causes the memory 124 to store radio wave intensity upon reception of each of probe responses. Moreover, the CPU 122 selects the SSID "SS1" corresponding to the AP 10 which is a sender of a probe response having highest radio wave intensity, that is, the AP 10 which exists at a nearest position to the printer 100, among the candidate APs 10 and 20. Next, in S62, the CPU 122 sends an information request including the selected SSID "SS1" to the mobile terminal 300.

Moreover, in a modification, the memory 124 may store a priority based on the perspective of security with respect to various combinations of authentication schemes and encryption schemes. Moreover, the CPU 122 may select an SSID corresponding to an AP using a use scheme with a highest priority among the candidate APs 10 and 20. In another modification, the CPU 122 may select an SSID of an AP which is a sender of a probe response received earliest among the candidate APs 10 and 20. In another modification, the CPU 122 may randomly select an SSID. In another modification, the CPU 122 may select an SSID by having the SSID list SL1 displayed on the display unit 104 and accepting an operation for selecting an SSID by the user via the operation unit 102.

In S64, in response to receiving the information request from the printer 100, the mobile terminal 300 activates an APP stored in the mobile terminal 300 and performs the following processes in accordance with the APP. That is, the mobile terminal 300 selects use information including the SSID "SS1" included in the information request (that is, "SS1" and "P0": refer to UT2 shown in FIG. 1) among the respective pieces of use information included in the use table UT2. Subsequently, in S66, the mobile terminal 300 sends a response including the selected use information to the printer 100.

When the response including use information is received from the mobile terminal 300 in S66, in S70, the CPU 122 attempts to establish a wireless connection with the AP 10 using the use information included in the response. Specifically, the CPU 122 performs sending of a probe request including the SSID "SS1" included in the information request and reception of a probe response and, further, communicates various signals (for example, an Authentication signal, an Association signal, and a 4-way handshake) with the AP 10. During the process of communicating the various signals, a password "P0" in the use information is sent to the AP 10 and authentication of the password "P0" is performed by the AP 10. The password "P0" is not currently used by the AP 10. Therefore, in S72, the CPU 122 receives a connection error notification indicating that a wireless connection cannot be established from the AP 10.

When a connection error notification is received in S72, in S80, the CPU 122 automatically selects another SSID "SS2" from the SSID list SL1. Moreover, in a similar manner to S62 and S66 described above, in S82, the CPU 122 sends an information request including the selected SSID "SS2" to the mobile terminal 300 and, in S86, receives a response including another use information (that is, "SS2" and "P2": refer to UT2 shown in FIG. 1) from the mobile terminal 300.

When a response including use information is received from the mobile terminal 300, in S90, the CPU 122 attempts to establish a wireless connection with the AP 20 using the use information included in the response. S90 is similar to S70 with the exception of using "SS2" and "P2". The password "P2" is currently being used by the AP 20. Therefore, authentication of the password "P2" is successful at the AP 20. As a result, in S92, the CPU 122 can establish a wireless connection with the AP 20.

Moreover, in the case A described above, if the SSID list SL1 only includes one SSID "SS1", when the CPU 122 receives a connection error notification in S72, the processing is terminated without performing the subsequent processes (S80 to S92). Moreover, if each of use information corresponding to each of the APs 10 and 20 is not registered in the use table UT2 of the mobile terminal 300, in S66, the CPU 122 receives an unstored notification indicating that use information is not stored from the mobile terminal 300 instead of receiving a response including the use information from the mobile terminal 300. In this case, the CPU 122 performs S80 and S82 without performing S70 and S72. However, the CPU 122 receives the unstored notification from the mobile terminal 300 in S86 and terminates processing without performing subsequent processes (S90 and S92).

As described above, according to the case A, when a wireless connection with the AP 10 cannot be established even when the printer 100 sends the information request of S62 to the mobile terminal 300 and receives the response of S66, the printer 100 sends the information request of S82 to the same mobile terminal 300 and receives the response of S86. In this manner, by adopting a configuration in which the printer 100 sends two or more information requests to the same mobile terminal 300, the possibility of the printer 100 obtaining an appropriate password "P2" which is capable of establishing a wireless connection with an AP can be increased. As a result, the printer 100 can appropriately establish a wireless connection with the AP 20.

Figure 4:
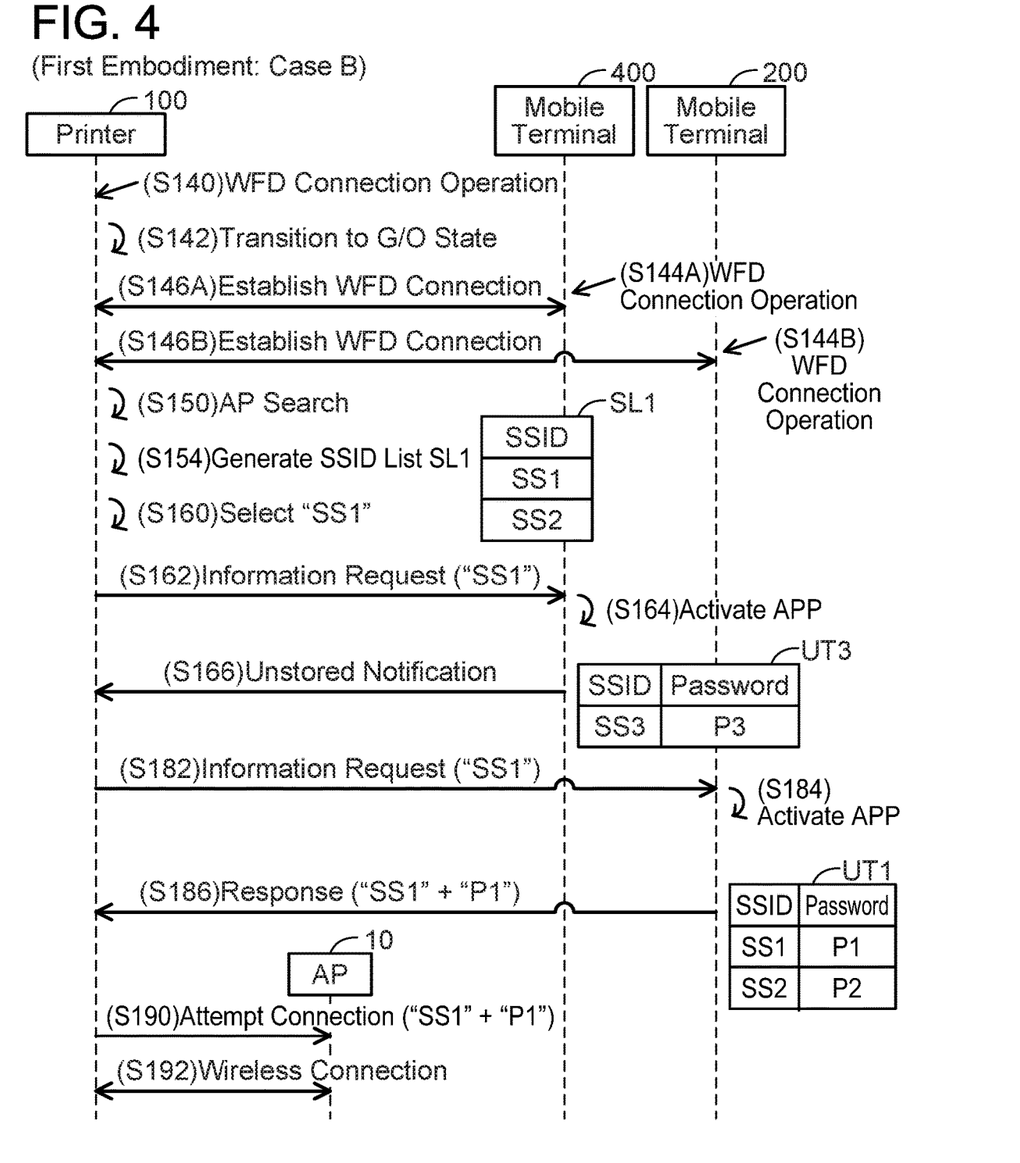
FIG. 4 shows a sequence chart for a case B where information request is sent to a plurality of mobile terminals.

(Case B Where Information Request is Sent to a Plurality of Mobile Terminals; FIG. 4)

A specific case B in accordance with the base sequence shown in FIG. 2 will be described with reference to FIG. 4. In the case A of FIG. 3, the printer 100 establishes a wireless connection with only one mobile terminal 300. Therefore, when the connection error notification of S72 is received as a result of using the password "P0" received in response to the sending of the information request including the SSID "SS1" to the mobile terminal 300, the printer 100 sends an information request including a different SSID "SS2" to the same mobile terminal 300 (S82). In contrast, in the case B, the printer 100 establishes a wireless connection with each of the plurality of mobile terminals 200 and 400. Therefore, if a connection error notification is received as a result of using the password received in response to the sending of the information request including the selected SSID to one mobile terminal, the printer 100 can send an information request including same SSID to another mobile terminal.

S140 and S142 are similar to S40 and S42 shown in FIG. 3. S144A and S144B are similar to S44 shown in FIG. 3 and S146A and S146B are similar to S46 shown in FIG. 3. As a result, the CPU 122 establishes a wireless connection with each of the two mobile terminals 200 and 400.

S150 to S164 are similar to S50 to S64 shown in FIG. 3. However, the processes of S50 and S52 are collectively expressed by S150. Moreover, the CPU 122 preferentially sends an information request to, for example, the mobile terminal 400 with which a wireless connection is established first among the two mobile terminals 200 and 400 (S162).

The mobile terminal 400 does not store use information including the SSID "SS1" in the information request of S162 (refer to UT3 shown in FIG. 1). As a result, in S166, the CPU 122 receives an unstored notification from the mobile terminal 400. Moreover, in S182, the CPU 122 sends an information request including the same SSID "SS1" to the mobile terminal 200 and starts up the APP 228 at the mobile terminal 200 (S184). Furthermore, in S186, the CPU 122 receives a response including use information (that is, "SS1" and "P1") from the mobile terminal 200. S190 and S192 are similar to S90 and S92 in FIG. 3 with the exception of the AP 10 being a target and the use of the SSID "SS1" and the password "P1". As a result, the CPU 122 can establish a wireless connection with the AP 10.

As described above, according to the case B, by adopting a configuration in which the printer 100 sends information requests including the same SSID to the plurality of mobile terminals 200 and 400, the possibility of the printer 100 obtaining an appropriate password "P1" which is capable of establishing a wireless connection with the AP 10 can be increased. As a result, the printer 100 can appropriately establish a wireless connection with the AP 10 that is a sender of a probe response having the highest radio wave intensity.

Moreover, instead of sending information requests to the plurality of mobile terminals 200 and 400 at the same time, the printer 100 sends an information request to the mobile terminal 200 after receiving an unstored notification from the mobile terminal 400. That is, if the appropriate password "P1" is received from the mobile terminal 400, the printer 100 need not send an information request to the mobile terminal 200. Therefore, processing load on the printer 100 can be reduced. Moreover, in a modification, the printer 100 may send information requests to the plurality of mobile terminals 200 and 400 at the same time.

(Corresponding Relationships)

The printer 100 is an example of a "communication device". The wireless LAN I/F 110 is an example of a "first wireless interface". In the case A shown in FIG. 3, the SSID "SS2" of S82, the password "P2" of S86 and the AP 20 are an example of a "target identifier (further N pieces of identifiers)", "target password" and "target access point", respectively. Moreover, in the case B shown in FIG. 4, the SSID "SS1" of S182, the password "P1" of S186 and the AP 10 are examples of "target identifier (further N pieces of identifiers)", "target password" and "target access point", respectively. Moreover, the mobile terminal 400 and the mobile terminal 200 are examples of "first terminal device" and "second terminal device", respectively.

A frequency in the 2.4 GHz band and a frequency in the 5.0 GHz band are an example of "first frequency" and "second frequency", respectively. The APs 10, 20, and 40 are examples of a "peripheral access point". Let us now assume a case where the AP 40 does not exist. In this case, after the search of S50 shown in FIG. 3 is performed, the printer 100 receives probe responses from the APs 10 and 20 without receiving a probe response from the AP 30 and generates an SSID list SL1 including the SSIDs "SS1" and "SS2". In this case, the APs 10, 20, and 30 are examples of a "peripheral access point".

(Second Embodiment)

In the present embodiment, in a case where there is a plurality of candidate APs, the printer 100 sends an information request including a plurality of SSIDs corresponding to the plurality of candidate APs to the mobile terminal 200 and the like. In particular, the printer 100 determines a priority of each candidate AP and sends an information request including priority information indicating the priority to the mobile terminal 200 and the like. A specific case that is realized according to the present embodiment will be described with reference to FIG. 5.

Figure 5:
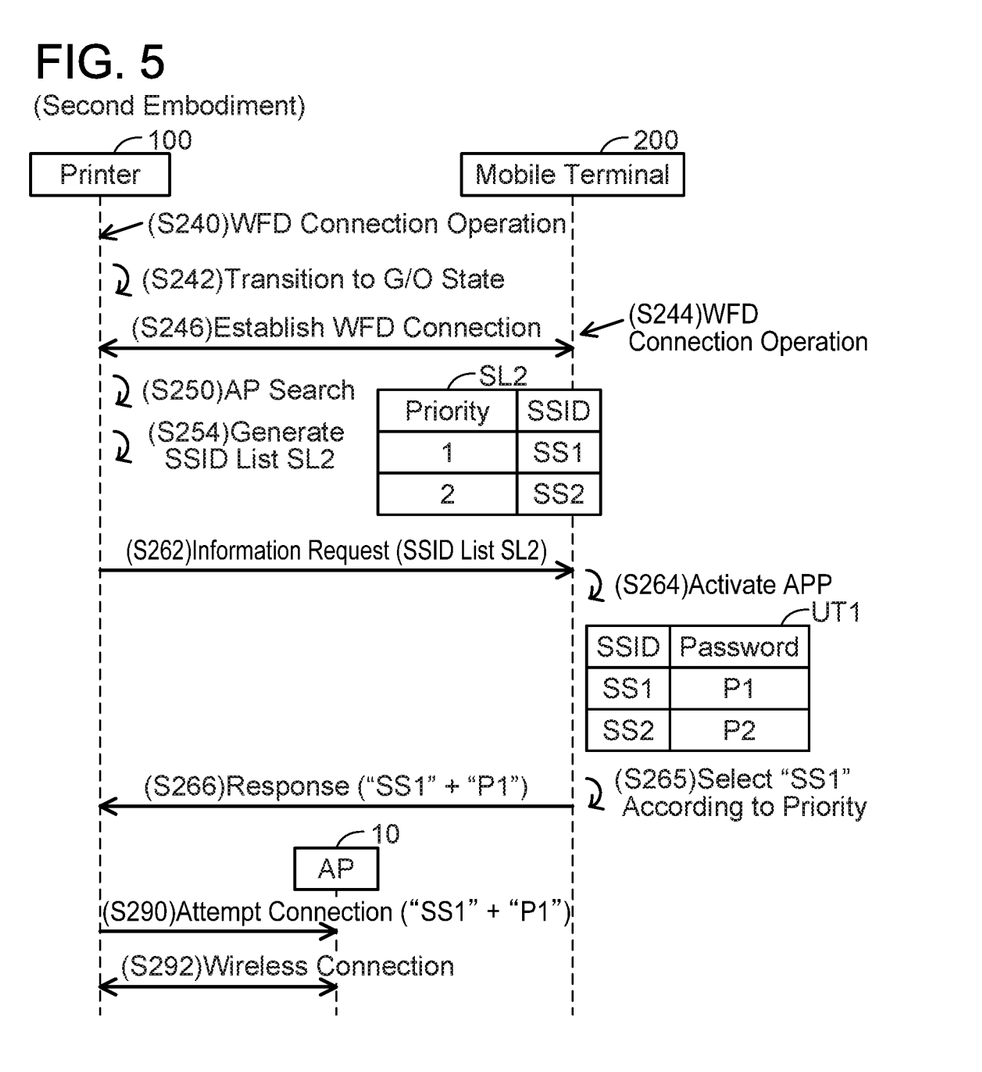
FIG. 5 shows a sequence chart for specific case of a second embodiment.

S240 to S250 are similar to S40 to S52 shown in FIG. 3 with the exception of the mobile terminal 200 being used and the processes of S50 and S52 being collectively expressed by S250. In S254, the CPU 122 specifies two SSIDs "SS1" and "SS2" in a similar manner to S54. The CPU 122 further determines the priorities of the two candidate APs 10 and 20 corresponding to the two SSIDs "SS1" and "SS2" and generates an SSID list SL2 including priority information. Specifically, the CPU 122 determines priorities of the candidate APs 10 and 20 based on a descending order of radio wave intensity of probe responses or, in other words, a descending order of proximity to the printer 100. In the present case, the CPU 122 assigns a priority "1" to the SSID "SS1" corresponding to the AP 10 that is a sender of a probe response having high radio wave intensity and, at the same time, assigns a priority "2" to the SSID "SS2" corresponding to the AP 20 that is a sender of a probe response having low radio wave intensity. Next, in S262, the CPU 122 sends an information request including the SSID list SL2 to the mobile terminal 200. Moreover, in a modification, the CPU 122 may determine priorities based on the perspective of security with respect to various combinations of authentication schemes and encryption schemes.

In response to receiving an information request from the printer 100, the CPU 222 activates the APP 228 in S264. Moreover, since the two SSIDs "SS1" and "SS2" in the SSID list SL2 are respectively included in the use table UT1, in S265, the CPU 222 selects the SSID "SS1" associated with priority information indicating the highest priority (in other words, the priority "1") among the SSIDs "SS1" and "SS2". The CPU 222 further selects the use information (in other words, "SS1" and "P1") including the selected SSID "SS1" from the use table UT1. Subsequently, in S266, the CPU 222 sends a response including the selected use information to the printer 100.

When a response including use information is received from the mobile terminal 200 in S266, the CPU 122 performs S290 and S292 in a similar manner to S90 and S92 in FIG. 3. As a result, the CPU 122 can establish a wireless connection with the AP 10.

Moreover, in the present case, if only one SSID "SS2" in the SSID list SL2 is included in the use table UT1, in S265, the CPU 222 selects use information (in other words, "SS2" and "P2") including the SSID "SS2" from the use table UT1 regardless of priority information. Moreover, if none of the SSIDs in the SSID list SL2 are included in the use table UT1, the CPU 222 sends an unstored notification to the printer 100. In this case, processing is terminated without performing subsequent processes (S290 and S292).

In the present embodiment, the printer 100 sends an information request in which priority information indicating a priority that is associated with each of the plurality of SSIDs "SS1" and "SS2" to the mobile terminal 200 (S262) and receives a response including use information (in other words, "SS1" and "P1") selected according to the priorities (S266). Therefore, the printer 100 can preferentially establish a wireless connection with the AP 10 having a relatively high priority. Moreover, in the present embodiment, the SSID "SS1" and "SS2" in the information request of S262 are examples of "N pieces of identifiers which is two or more identifiers". Moreover, the use information in S266, the SSID "SS1", and the password "P1" are an example of "particular use information", "target identifier", and "target password", respectively.

(Third Embodiment)

In the present embodiment, the printer 100 receives a response including the use table UT1 itself and the like from the mobile terminal 200 and the like. In particular, in a case where there is a plurality of candidate APs, the printer 100 determines a priority of each candidate AP and selects an AP with which a wireless connection is to be established based on the priorities. A specific case that is realized according to the present embodiment will be described with reference to FIG. 6.

Figure 6:
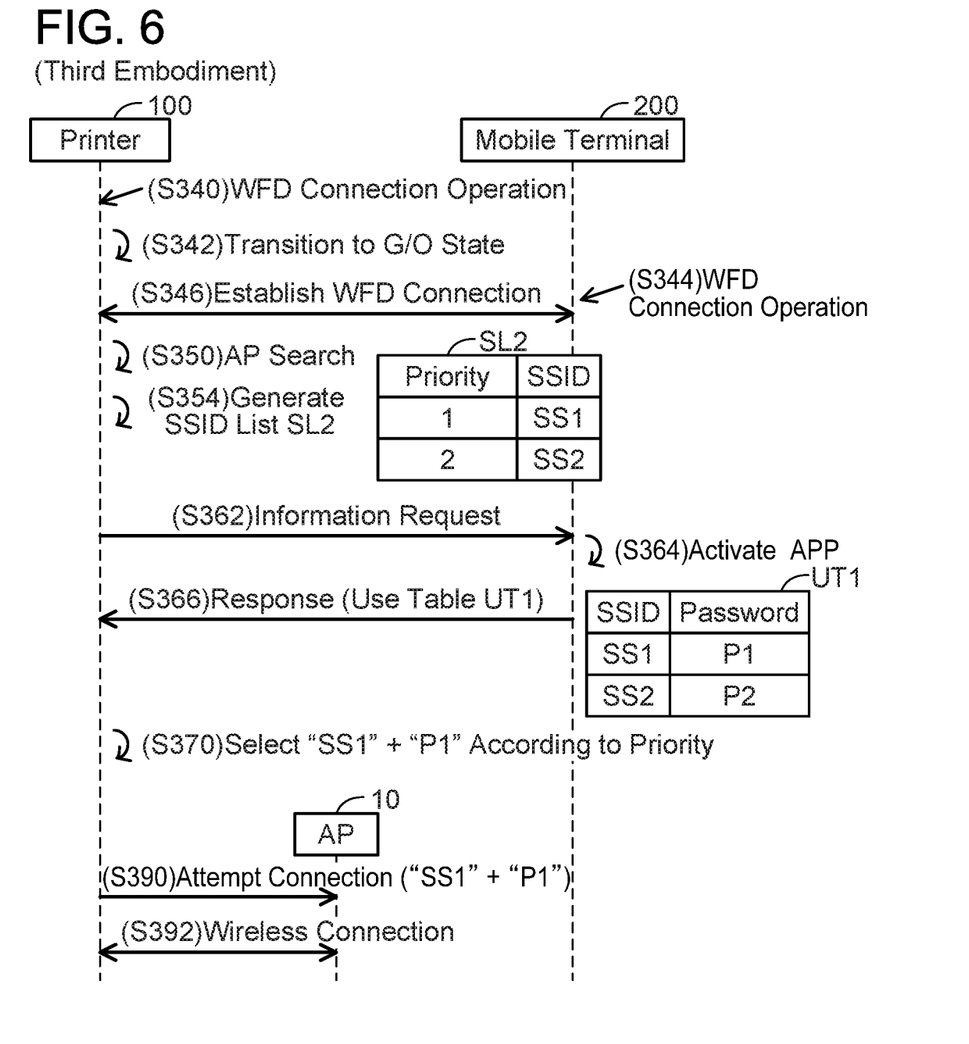
FIG. 6 shows a sequence chart for specific case of a third embodiment.

S340 to S354 are similar to S240 to S254 shown in FIG. 5. In S362, the CPU 122 sends an information request for requesting sending of the use table UT1 itself to the mobile terminal 200, causes the APP 228 of the mobile terminal 200 to be activated (S364), and receives a response including the use table UT1 from the mobile terminal 200 (S366).

Since the two SSIDs "SS1" and "SS2" included in the use table UT1 are included in the SSID list SL2, in S370, the CPU 122 selects the SSID "SS1" associated with priority information indicating the highest priority (in other words, the priority "1") among the SSIDs "SS1" and "SS2". The CPU 122 further selects the use information (in other words, "SS1" and "P1") including the selected SSID "SS1" from the use table UT1. Thus, using the selected use information, the CPU 122 performs S390 and S392 in a similar manner to S290 and S292 shown in FIG. 5. As a result, the CPU 122 can establish a wireless connection with the AP 10.

Moreover, in the present case, if only one SSID "SS2" in the SSID list SL2 is included in the use table UT1, in S370, the CPU 122 selects use information (that is, "SS2" and "P2") corresponding to the AP 20 from the SSID list SL2 regardless of priority information and, in S390 and S392, establishes a wireless connection with the AP 20 by using the selected use information. Moreover, assuming that none of the SSIDs in the SSID list SL2 are included in the use table UT1, the CPU 122 terminates processing without performing the subsequent processes (S390 and S392).

In a similar manner to the second embodiment, even with the present embodiment, the printer 100 can preferentially establish a wireless connection with the AP 10 having a relatively high priority. Moreover, in the present embodiment, the use information selected in S370 is an example of "particular use information".

(Fourth Embodiment)

Figure 7:
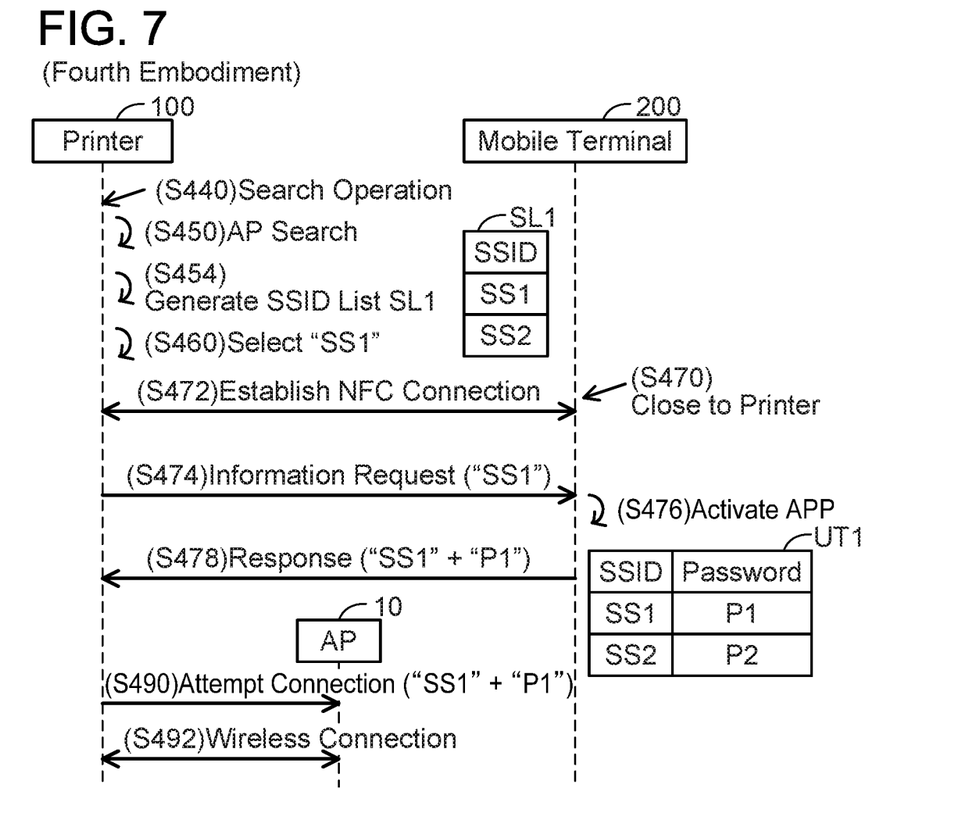
FIG. 7 shows a sequence chart for specific case of a fourth embodiment.

In the present embodiment, the printer 100 is provided with an NFC (abbreviation of Near Field Communication) I/F 108 (refer to FIG. 1). The NFC I/F 108 is a wireless I/F for performing an NFC communication (in other words, a type of so-called near field wireless communication) in accordance with the NFC scheme. The NFC scheme is a wireless communication scheme based on, for example, an international standard such as ISO/IEC 21481 or ISO/IEC 18092. The NFC I/F 108 may be any of an I/F referred to as an NFC Forum Device and an I/F referred to as an NFC Forum Tag. That is, the NFC I/F 108 may actively send (as the former I/F) information (that is, the information request in S474 to be described later) or may passively send (as the latter I/F) in response to a read request. Moreover, the mobile terminal 200 comprises an NFC I/F 208.

A difference between a wireless LAN I/F and an NFC I/F will now be described. A communication speed (for example, a maximum communication speed of 11 to 600 Mbps) of wireless communication via a wireless LAN I/F is higher than a communication speed (for example, a maximum communication speed of 100 to 424 Kbps) of wireless communication via a NFC I/F. Moreover, a frequency (for example, in the 2.4 GHz band or the 5.0 GHz band) used by wireless communication via a wireless LAN I/F differs from a frequency (for example, in the 13.56 MHz band) used by wireless communication via a NFC I/F. Furthermore, a maximum distance (for example, a maximum of approximately 100 m) over which wireless communication via a wireless LAN I/F can be performed is greater than a maximum distance (for example, a maximum of approximately 10 cm) over which wireless communication via an NFC I/F can be performed.

A specific case that is realized according to the present embodiment will be described with reference to FIG. 7. In S440, the CPU 122 accepts performance by the user on the operation unit 102 of the printer 100 of a search operation that is a trigger for a search for a candidate AP.

In response to accepting the search operation, the CPU 122 performs S450 to S460 in a similar manner to S50 to S60 shown in FIG. 3.

In S470, the user of the mobile terminal 200 brings the mobile terminal 200 close to the printer 100. As a result, a distance between the NFC I/F 108 and the NFC I/F 208 equals or falls below a prescribed distance (for example, 10 cm) and, in S472, an NFC connection via the NFC I/Fs 108 and 208 is established between the printer 100 and the mobile terminal 200.

Next, in S474, the CPU 122 sends an information request including the SSID "SS1" selected in S460 to the mobile terminal 200 via the NFC I/F 108. Accordingly, the CPU 122 causes the APP 228 of the mobile terminal 200 to be activated (S476) and, in S478, the CPU 122 receives a response including use information (in other words, "SS1" and "P1") from the mobile terminal 200 via the NFC I/F 108. Moreover, using the use information in the response, the CPU 122 performs S490 and S492 in a similar manner to S90 and S92 shown in FIG. 3. As a result, the CPU 122 can establish a wireless connection with the AP 10.

According to the present embodiment, the printer 100 uses NFC communication to communicate an information request and a response (S474 and S478). Even with the present embodiment, the printer 100 can appropriately establish a wireless connection with the target AP 10 among the one or more candidate APs 10 and 20. Moreover, in the present embodiment, the NFC I/F 108 is an example of a "second wireless interface".

(First modification) In S66 and S86 shown in FIG. 3, the CPU 122 may receive a response including only a password (for example, "P2") or, in other words, a response not including an SSID (for example, "SS2") from the mobile terminal 300. In this case, the CPU 122 may establish a wireless connection with the AP 20 using the SSID "SS2" in the information request of S82 and the password "P2" in the response in, for example, S90 and S92. Generally, a response at least including a target password need only be received from a terminal device.

(Second modification) In the case shown in FIG. 6, the CPU 122 sends an information request to the mobile terminal 200 in S362 after specifying a candidate AP in S350. Alternatively, the CPU 122 may send an information request to the mobile terminal 200 before specifying a candidate AP and receive a response including the use table UT1 from the mobile terminal 200. Subsequently, the CPU 122 may specify a candidate AP and generate the SSID list SL2, and select use information including "SS1" and "P1". That is, an order of performing a process of specifying a candidate access point and a process of sending an information request and receiving a response is not particularly limited.

(Third modification) The CPU 122 may select two SSIDs "SS1" and "SS2" in the SSID list SL1 in S60 in FIG. 3, send an information request including the two selected SSIDs to the mobile terminal 300 in S62, and receive a response including two pieces of use information from the mobile terminal 300 in S66. In this case, the CPU 122 may sequentially perform the attempt processes S70 and S90 by sequentially using the two pieces of use information. That is, two or more identifiers may be selected.

(Fourth modification) The CPU 122 may perform the communications of S62, S66, S82, and S86 in FIG. 3 via the NFC I/F 108. Moreover, the CPU 122 may perform the communications of S162, S166, S182, and S186 in FIG. 4 via the NFC I/F 108. In this case, in response to receiving an unstored notification from the mobile terminal 400 in S166, the CPU 122 displays a message indicating that another mobile terminal should be brought closer to the printer 100 on the display unit 104. As a result, since the user brings the mobile terminal 200 closer to the printer 100, the CPU 122 can perform communications of S182 and S186 via the NFC I/F 108. Furthermore, the CPU 122 may perform the communications of S262 and S266 shown in FIG. 5 and the communications of S362 and S366 shown in FIG. 6 via the NFC I/F 108.

(Fifth modification) The wireless LAN I/F 110 may support a so-called soft AP instead of supporting the WFD scheme. In this case, the CPU 122 may activate a soft AP and form a wireless NW in which the printer 100 operates as a parent station in, for example, S42 shown in FIG. 3 and establish a wireless connection in accordance with the soft AP with the mobile terminal 300 in S46. That is, an "information request" and a "response" may be communicated with a terminal device using a wireless connection in accordance with a wireless connection scheme that differs from the WFD scheme.

(Sixth modification) Moreover, the printer 100 may include a Bluetooth (registered trademark: hereinafter, described as "BT") I/F for performing wireless communication in accordance with the BT scheme instead of the NFC I/F 108. Furthermore, the CPU 122 may establish a wireless connection in accordance with the BT scheme in, for example, S472 shown in FIG. 7 and perform the communications of S474 and S478 via the BT I/F. That is, an "information request" and a "response" may be communicated with a terminal device via a wireless interface which differs from the first wireless interface and which is used to perform a wireless connection in accordance with a wireless connection scheme that differs from the NFC scheme.

(Seventh modification) The wireless LAN I/F 110 may have the capability of using frequencies in both the 2.4 GHz band and the 5.0 GHz band. In this case, in S54 shown in FIG. 3, the CPU 122 may specify three APs 10 to 30 among the four APs 10 to 40. In the present modification, the four APs 10 to 40 and the three APs 10 to 30 are examples of a "peripheral access point" and "candidate access point", respectively.

(Eighth modification) The wireless LAN I/F 110 may support the use scheme "U2" in addition to the use scheme "U1". In this case, in S54 shown in FIG. 3, the CPU 122 may specify three APs 10, 20, and 40 among the four APs 10 to 40 by receiving probe responses from the three APs 10, 20, and 40. In the present modification, the four APs 10 to 40 and the three APs 10, 20, and 40 are examples of a "peripheral access point" and "candidate access point", respectively.

(Ninth modification) A "communication device" is not limited to the printer 100 and may include all communication devices (for example, a multi-function machine, a scanner, and a FAX device) capable of establishing a wireless connection with an AP.

What is claimed is:

1. A communication device comprising:
a first wireless interface;
a processor; and
a memory configured to store computer-readable instructions therein, the computer-readable instructions, when executed by the processor, causing the communication device to perform:

searching, via the first wireless interface, so as to specify one or more candidate access points, each of the one or more candidate access points being an access point with which the communication device is able to establish a wireless connection;

sending an information request to a terminal device different from the communication device, the information request being for requesting the terminal device to send information regarding an experienced access point and for establishing a wireless connection with the experienced access point, the experienced access point having an experience of establishing a wireless connection with the terminal device, the terminal device storing a wireless profile which has been used by the terminal device for establishing the wireless connection with the experienced access point;

receiving a response including a target password of the experienced access point included in the wireless profile from the terminal device different from the communication device in response to sending the information request; and establishing a wireless connection with a target access point, which is identical to the experienced access point, among the one or more candidate access points via the first wireless interface by using the target password included in the response.

2. The communication device as in claim 1, wherein the information request is sent to each of a plurality of the terminal devices.

3. The communication device as in claim 2, wherein in a case where the response including the target password is not received from a first terminal device in response to sending the information request to the first terminal device among the plurality of the terminal devices, the information request is sent to a second terminal device among the plurality of the terminal devices.

4. The communication device as in claim 1, wherein
the specifying of the one or more candidate access points is performed by receiving an identifier for identifying each of the one or more candidate access points via the first wireless interface from each of the one or more candidate access points, the information request includes a target identifier for identifying one access point among the one or more candidate access points, and in a case where the wireless profile includes the target password and the target identifier included in the information request, the response including the target password is received from the terminal device in response to sending the information request.

5. The communication device as in claim 4, wherein the computer-readable instructions, when executed by the processor, cause the communication device to further perform:
in a case where a plurality of the candidate access points is specified, selecting, without receiving a selection by a user, the target identifier among a plurality of identifiers for identifying the plurality of the candidate access points, wherein the information request including the selected target identifier is sent to the terminal device.

6. The communication device as in claim 1, wherein
the specifying of the one or more candidate access points is performed by receiving an identifier, for identifying the one or more candidate access points via the first wireless interface, from each of the one or more candidate access points, in a case where a plurality of the candidate access points is specified, the information request including two or more identifiers, among a plurality of identifiers for identifying the plurality of the candidate access points, is sent to the terminal device, and in a case where the wireless profile includes the target password and a target identifier among the two or more identifiers included in the information request, the response including the target password is received from the terminal device in response to sending the information request.

7. The communication device as in claim 6, wherein the computer-readable instructions, when executed by the processor, cause the communication device to further perform:
determining a priority of the plurality of the candidate access points in the case where the plurality of the candidate access points is specified, wherein the information request includes the two or more identifiers respectively associated with priority information indicating the determined priority, in a case where the terminal device stores two or more wireless profiles which have been used by the terminal device for establishing wireless connections with two or more experienced access points and the two or more wireless profiles include two or more identifiers included in the information request, the response including the target password included in a particular wireless profile among the two or more wireless profiles is received, the particular wireless profile is a wireless profile including the target identifier corresponding to the priority information indicating the highest priority among the two or more wireless profiles, and the wireless connection with the target access point is established by using the target identifier and the target password included in the response via the first wireless interface.

8. The communication device as in claim 1, wherein
the specifying of the one or more candidate access points is performed by receiving an identifier for identifying the one or more candidate access points via the first wireless interface from each of the one or more candidate access points, the computer-readable instructions, when executed by the processor, cause the communication device to further perform:
determining a priority of a plurality of the candidate access points in a case where the plurality of the candidate access points is specified, wherein in a case where the terminal device stores two or more wireless profiles which have been used by the terminal device for establishing wireless connections with two or more experienced access points, the response including the two or more wireless profiles is received from the terminal device, and each of the two or more wireless profiles includes an identifier for identifying the experienced access point and a password for establishing a wireless connection with the experienced access point, wherein the computer-readable instructions, when executed by the processor, cause the communication device to further perform:
in a case where a plurality of identifiers for identifying the plurality of the candidate access points includes two or more identifiers included in the two or more wireless profiles, selecting a particular wireless profile among the two or more wireless profiles, the particular wireless profile including an identifier for identifying a candidate access point having the highest priority, the wireless connection with the target access point is established by using the target password and the identifier included in the selected particular wireless profile.

9. The communication device as in claim 1, wherein the specifying of the one or more candidate access points is performed by:

searching via the first wireless interface so as to receive one or more access point information via the first wireless interface from one or more peripheral access points that are present around the terminal device, the access point information including scheme information indicating an authentication scheme and an encryption scheme which are currently used by the peripheral access point; and specifying from the one or more peripheral access points, by using one or more scheme information included in the one or more access point information, the one or more candidate access points which currently use an authentication scheme and an encryption scheme which are supported by the communication device.

10. The communication device as in claim 1, wherein the first wireless interface is configured to communicate a signal having a first frequency and to not communicate a signal having a second frequency, the specifying of the one or more candidate access points is performed by:

sending a search signal via the first wireless interface by using the first frequency; and in response to sending the search signal, receiving one or more access point information via the first wireless interface from the one or more candidate access points which currently use the first frequency among one or more peripheral access points that are present around the terminal device.

11. The communication device as in claim 1, wherein the first wireless interface supports a Wi-Fi Direct (WFD) scheme developed by the Wi-Fi Alliance, in a case where a WFD wireless connection according to the WFD scheme is being established with the terminal device via the first wireless interface, the information request is sent to the terminal device via the first wireless interface by using the WFD wireless connection according to the WFD scheme; and the response is received from the terminal device via the first wireless interface by using the WFD wireless connection according to the WFD scheme.

12. The communication device as in claim 11, wherein when the WFD wireless connection according to the WFD scheme is established with the terminal device via the first wireless interface, the searching and the specifying of the one or more candidate access points are performed.

13. The communication device as in claim 1, further comprising:

a second wireless interface different from the first wireless interface, the second wireless interface configured to perform an NFC (abbreviation of Near Field Communication) wireless communication according to NFC scheme, wherein the information request is sent to the terminal device via the second wireless interface and the response is received from the terminal device via the second wireless interface.

14. A non-transitory computer-readable recording medium storing computer-readable instructions for a communication device, the computer-readable instructions, when executed by a processor of the communication device, causing the communication device to perform:

searching via a first wireless interface of the communication device so as to specify one or more candidate access points, each of the one or more candidate access points being an access point with which the communication device is able to establish a wireless connection;

sending an information request to a terminal device different from the communication device, the information request being for requesting the terminal device to send information regarding an experienced access point and for establishing a wireless connection with the experienced access point, the experienced access point having an experience of establishing a wireless connection with the terminal device, the terminal device storing a wireless profile which has been used by the terminal device for establishing the wireless connection with the experienced access point;

receiving a response including a target password of the experienced access point included in the wireless profile from the terminal device different from the communication device in response to sending the information request; and establishing a wireless connection with a target access point, which is identical to the experienced access point, among the one or more candidate access points via the first wireless interface by using the target password included in the response.

15. The non-transitory computer-readable recording medium according to claim 14, wherein the wireless profile includes an SSID and a password.

16. The communication device according to claim 1, wherein the wireless profile includes an SSID and a password.

* * * * *